US010255627B2

United States Patent
Ignatius

(10) Patent No.: US 10,255,627 B2
(45) Date of Patent: Apr. 9, 2019

(54) SERVICE BROKER FOR SERVICE-ORIENTED ARCHITECTURE

(71) Applicant: CA, Inc., Islandia, NY (US)

(72) Inventor: Paul P. Ignatius, North Grafton, MA (US)

(73) Assignee: CA, Inc., New York, NY (US)

( * ) Notice: Subject to any disclaimer, the term of this patent is extended or adjusted under 35 U.S.C. 154(b) by 972 days.

(21) Appl. No.: 14/465,873

(22) Filed: Aug. 22, 2014

(65) Prior Publication Data

US 2016/0055556 A1 Feb. 25, 2016

(51) Int. Cl.
*G06Q 30/00* (2012.01)
*G06Q 30/06* (2012.01)

(52) U.S. Cl.
CPC ..... *G06Q 30/0609* (2013.01); *G06Q 30/0611* (2013.01); *G06Q 30/0613* (2013.01)

(58) Field of Classification Search
CPC ............ G06Q 30/0601–30/0645; G06Q 30/08
USPC ......................................... 705/26.1–27.2, 26
See application file for complete search history.

(56) References Cited

U.S. PATENT DOCUMENTS

| 2003/0097296 | A1* | 5/2003 | Putt ........................ | G06Q 10/06 705/7.23 |
| 2008/0065402 | A1* | 3/2008 | Sanamrad ............. | G06F 9/5055 705/7.41 |
| 2009/0187441 | A1* | 7/2009 | Richardson ........ | G06Q 10/0639 705/7.38 |
| 2013/0144800 | A1* | 6/2013 | Fallows ............. | G06Q 30/0282 705/341 |
| 2014/0310121 | A1* | 10/2014 | Bhojwani .......... | G06Q 30/0611 705/26.4 |
| 2014/0316925 | A1* | 10/2014 | Roberts .............. | G06Q 30/0611 705/26.4 |
| 2015/0067171 | A1* | 3/2015 | Yum ..................... | G06F 9/5072 709/226 |

OTHER PUBLICATIONS

Huang, Jianhui: "Pricing Strategy for Cloud Computing Services," Singapore Management University (Singapore), ProQuest Dissertations Publishing, 2013; ProQuest Dialog #1837080410 144pgs. (Year: 2013).*

Martens, Benedikt: "Decision-making in cloud computing environments: A cost and risk based approach," Teuteberg, Frank. Information Systems Frontiers14.4: 871-893, Sep. 2012, Springer Science & Business Media; ProQuest Dialog # (Year: 2012).*

* cited by examiner

*Primary Examiner* — Robert M Pond

(74) *Attorney, Agent, or Firm* — Meyertons, Hood, Kivlin, Kowert & Goetzel, P.C.

(57) ABSTRACT

A method for brokering a cloud service comprises receiving a request for a service and identifying parameters from the request. Further, a set of vendors who may satisfy the parameters of the requested service is identified. An invitation to respond based on the parameters is transmitted to the set of vendors. Responses including an estimation regarding the parameters are received from the vendors, and confidence levels that the vendors will meet the estimations are calculated based on an objective service history of the specific services. The responses and confidence levels are presented to the requester, and the service history is updated based on parameter results once the service has completed.

20 Claims, 4 Drawing Sheets

SERVICE BROKER FOR SERVICE-ORIENTED ARCHITECTURE

BACKGROUND

Various aspects of the present disclosure relate generally to service-oriented architectures and more specifically to a service broker in a service-oriented architecture.

A service-oriented architecture is a software design schema based on discrete pieces of software that act as a service to other applications. When an application requires a function to be performed, the application may send a request to an external service provided by a vendor or to a service broker that may help the requester choose a vendor that can fulfill that function as a service. Regardless, thus, the vendor will perform the function and pass the results to the application.

In cloud computing, many vendors offer functional services such as infrastructure-as-a-service (IaaS), platform-as-a-service (PaaS), and software-as-a-service (SaaS). To perform these functions, the services may require a description of a computing environment. Also, the services may require that the computing environment to be uploaded (e.g., OpenShift cartridge, Amazon Machine Images (AMI) for the Elastic Compute Cloud (EC2) environment, supplying runtime operational parameters, etc.). However, it may alternatively be sufficient simply to send the execution content (e.g., data in an e-mail).

In many cases, several vendors offer similar services, so the application has several vendors from which to choose when requesting certain functionality. In such cases, a service broker may act as an intermediary between the vendors and purchasers of computing services. Typically, the service broker includes a service catalog that lists all of the services that vendors associated with the service broker can perform. When an application requires a service, the application sends a request to the service broker, and the service broker sets up an agreement between the requester and a chosen vendor.

BRIEF SUMMARY

According to aspects of the present disclosure, a method for brokering a cloud service comprises receiving a request for a cloud service and identifying parameters of the service and computing information to service the request. Further, the method comprises identifying a set of vendors who may satisfy the parameters of the requested service, and transmitting an invitation to respond to the set of vendors. Here the invitation identifies the identified parameters. The method still further comprises receiving responses to the transmitted invitation, where each received response includes an estimation from a vendor associated with the response, regarding the parameters. Also, the method comprises determining, for each received response, a confidence level, where the confidence level characterizes a confidence that the vendor associated with the response will meet the estimations of the parameters and is based on an objective service history of the service provided by the vendor. Moreover, the method comprises presenting the received responses and the confidence levels to the requester, and updating the objective service history of the service associated with a vendor selected by the requester, where the objective service history is updated based on parameter results of the requester using the service associated with the selected vendor.

DETAILED DESCRIPTION

According to aspects of the present disclosure, a service broker in a cloud-computing system acts as an intermediary between a requester of a service and vendors that provide the requested service. The requester sends a request to the service broker requesting information to help selection of a service. The request identifies parameters of the service and its execution, which may include any combination of parameters that the service must meet (i.e., mandatory parameters) or should meet (i.e., preferred parameters). These parameters may be provided using custom metadata tags within the request itself.

Then, the service broker sends an "invitation to respond" to vendors who may meet the parameters of the service. Each vendor that responds to the invitation with an indication that they can provide the service also includes an estimate of its performance with regard to the parameters. The response may include information additional to the mandatory and preferred parameters described above. Further, the service broker looks at an objective past history of the given service provided by each vendor and creates a confidence level for each vendor who provided an estimate indicating how confident the service broker is that the vendor will meet the parameters. Then, the service broker sends the responses and confidence levels to the requester, so the requester can select which vendor should supply the requested service.

After the service has been performed for the requester, the service broker updates the objective service history for that service provided by the selected vendor. In an illustrative example, the update to the objective service history is based on the actual performance of the service (i.e., a transaction) as evaluated in regard to the parameters of the service that were identified by the requestor. Further, the requester for the service may confirm or otherwise verify the results of the service. That updated objective service history can then be used in a future confidence level determination.

Figure 1:
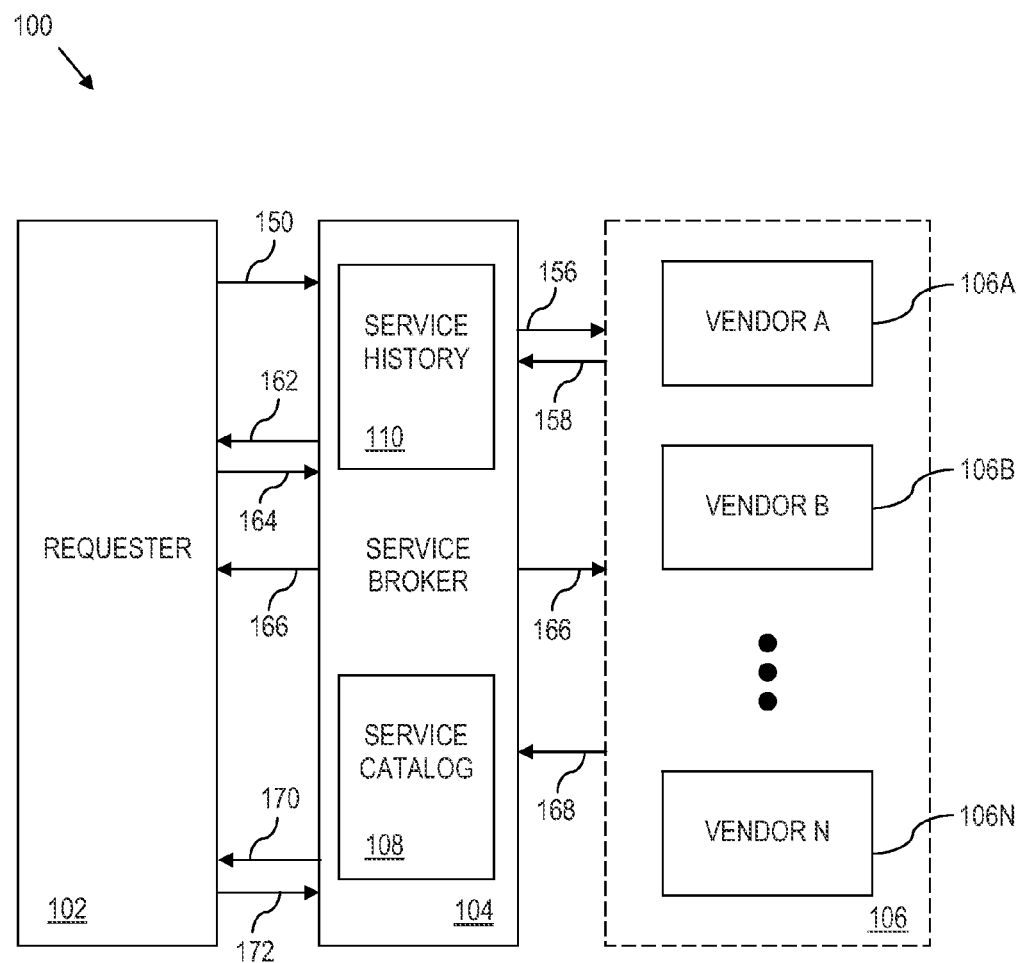
FIG. 1 is a block diagram illustrating a system and method for brokering a service transaction between a requester and a vendor of a service, according to various aspects of the present disclosure.

Referring to drawings and in particular FIG. 1, a system 100 illustrating a method for brokering a service transaction in a cloud-computing environment is shown. The system 100 includes a requester 102, a service broker 104, and a plurality of vendors 106A-N (collectively referred to as 106) of services that the requester 102 may use. The service broker 104 keeps track of the services provided by the vendors 106A-N in a service catalog 108. Further, the service broker 104 keeps track of parameter results from transactions that have been brokered through the service broker 104 in an objective service history 110. As shown, both the service catalog 108 and the objective service history 110 are stored within the service broker 104; however, the service catalog 108, the service history 110, or both may be stored elsewhere (e.g., elsewhere in the cloud) as long as the service broker 104 has access to both the service catalog 108 and the service history 110.

In FIG. 1, the method is shown as a series of transactions between the requester 102, the service broker 104, and the plurality of vendors 106 using arrows between the components of the system 100. The arrows are staggered vertically to show an order that the transactions occur; however, it is within the scope of the disclosure to alter the order of the transactions.

At 150, the requester 102 sends a "request for estimates" (i.e., a query) to the service broker 104. The request includes parameters (mandatory, preferred, or both) including details of the requested service (e.g., a type of execution environment required to execute the request). For example, if the request is to execute a snippet of code that requires a Linux environment to function properly, then the request could include the snippet of code and a mandatory parameter of a Linux environment. Alternatively to sending the code snippet, the requester may send a uniform resource locator (URL) pointing to where the snippet of code resides.

Other examples of a computing environment include, but are not limited to: a type of PaaS computing environment and stipulations on containers of execution (e.g., open service gateway initiative (OSGi), virtual machines, etc.). Other types of requests include simple REST (Representative State Transfer) invocations or other service parameters.

As mentioned above, the request may include mandatory parameters, preferred parameters, or both, which may be specified using custom metadata tags. Examples of parameters include service-level-agreement parameters (e.g., time, performance, reliability, etc.), geographical location of where the service is to take place, laws and regulations concerning the service, execution constraints, power requirements (e.g., moderation of carbon footprint to perform the service, performed using renewable energy, etc.), safe-harbor regulations, storage-container type, etc.

A pseudo-code example of a request for estimates is provided below.

```
{
    RFPID = "Yong",
    RESTRICTION "runtime environment" = "Windows",
    RESTRICTION "code stack" = ".net 4.0"
    RESTRICTION_TYPE= "Pedantic",
    "code snippet" = <URL>,
    RESTRICTION "geo restriction" = "Europe", "North America"
    RESTRICTION_TYPE = "enforced",
    REQUEST_TYPE = "Compute"
}
```

The name of the request is "Yong." There are two preferred parameters identified by the custom tag RESTRICTION, which are followed by a RESTRICTION TYPE custom tag of "Pedantic": a Windows runtime environment using a .net 4.0 code stack. Further, the request references a URL (e.g., www.cacodesnippet.com/examplesnippet/) instead of passing a code snippet directly. One mandatory (e.g., "enforced") parameter requires the computation to be performed based upon a geo restriction, in Europe or North America in the above-example. The syntax and names are only examples; other syntax and names may be used (e.g., "RFEID" instead of "RFPID," "runtime_environment" instead of "runtime environment," "mandatory" instead of "enforced," etc.). Further, tokens may be used for commonly used parameters and values.

The service broker 104 identifies any mandatory parameters, and optionally, any preferred parameters. For example, the service broker 104 may identify custom tags in the request for estimates and extract the parameter names and parameter values from the custom tags.

Using the identified parameters, the service broker 104 creates an "invitation to respond". In certain illustrative examples, the service broker may also determine a deadline for qualified vendors to answer the invitation to respond.

The invitation to respond may include a time-limit threshold within which each vendor 106A-N must complete the requested service. This time-limit threshold may be included in the request for estimates from the requester 102, or the time-limit threshold may be negotiated beforehand such that all requests for estimate from a specific requester 102 require the pre-negotiated time-limit threshold. For example, if the requester 102 negotiates a fifteen-microsecond time-limit threshold, then the vendors 106 must complete the service within fifteen microseconds.

At 156, the service broker 104 transmits the invitation to the plurality of vendors 106. In some embodiments, the service broker 104 sends the invitation to respond to only a subset of the vendors 106A-N of the plurality of vendors 106. The vendors 106 who receive the invitation determine whether they can satisfy the specified parameters (mandatory, preferred, or both) in the invitation and prepare a response including estimates on how the vendor will meet or exceed the values of the specified parameters.

For example, the requestor 102, service broker 104, and the vendors 106 are implemented in software. As such, there may be common ontology on most (if not all) of the tags that are passed between the requestor 102, the service broker 104 and the vendors 106. In this regard, the service broker 104 may be programmed to pass to the vendors 106, tags that include both the parameters and parameter values received from the requestor 102.

At 158, the service broker 104 receives estimate responses individually from the vendors 106. The estimate responses should include pricing information and an estimated time (or time range) to complete the requested service. In addition, the estimate response should include estimated values for the mandatory parameters and preferred parameters. Thus, each vendor 106 is given the option to describe not just the aspects of the service's performance and reliability (e.g., speed, availability, etc.), but also the cost of execution, location of execution, a URL to a list of laws governing the transaction, methods of execution, size of the execution, etc. For example, the vendor can indicate that the service will be executed using OSGi containers on a Java virtual machine (JVM) on a mainframe powered by renewable energy, a cloud computing resource located in the Republic of Congo, etc. Moreover, the service vendor may indicate the cost based on a fixed price or a flexible price (e.g., based on attributes like loading of a system on which the service will run, time for the service to run, service-level agreements of reliability, etc.).

A pseudo-code example of an estimate response is provided below. As with the request for estimate, custom tags may be used to pass parameters.

```
{
    RESPONSEID = "foo",
    PROVIDER = "Vendor A",
    SERVICEID = "Service XY",
```

-continued

```
    ESTIMATE "system load" = 80%,
    ESTIMATE "cost" = $2.51/100 run,
    ESTIMATE "time to execute" = 0.01ms,
    ESTIMATE "geo restriction" = "North America",
    ESTIMATE TYPE = "Pedantic"
}
```

Thus, in a response named "foo," Vendor A 160A estimated that Service XY (provided by Vendor A) could be used to complete the computation at a cost of $2.51 for every 100 runs, where each run would be done in approximately 10 microseconds. Further, the service is estimated to be performed in North America.

The service broker 104 uses the received responses to filter out any estimates that do not meet the mandatory requirements. For example, if the request requires a fifteen-microsecond response time and Vendor B estimates a twenty-microsecond response time, then the service broker 104 will filter out the response from Vendor B. In another example, if the requester requires that the service be performed in North America or Europe and Vendor C estimates that the service will be performed in Botswana, then the service broker will filter out the response from Vendor C. Further, the service broker may filter, order, or both the remaining responses based on the preferred parameters.

Further, real-time-computing principles may also be used in filtering and ordering. For example, the service broker can implement a deadline by which the vendors must respond, and vendors who fail to respond within the deadline are deemed to not meet the required parameters and are thus filtered out. Also, the responses can be further filtered, ordered, or both based on priority rules of the service broker, the requester, or both. For example, a requester can have three mandatory parameters and two preferred parameters (e.g., execution time, carbon footprint, ecological impact, monetary cost, etc.). However, the requester may request that the service broker order the responses based on the second preferred parameter and third mandatory parameter (in that order), and the service provider will order the responses accordingly. As such, the filtering and ordering may be based on simple minimal factor decisions or may be a complex selection rule based on various preferred and mandatory parameters, which may be evaluated by heuristics or a real optimal-value assessment.

The service broker 104 takes the remaining responses from the vendors and uses the objective service history 110 to create a confidence level that the vendor will actually be able to meet the estimates. For example, the vendor may estimate the time to complete the service based on an optimal path; however, in reality it may be that the optimal path only happens 75% of the time. Based on the objective service history 110, the service broker 104 would know that the specific service from the specific vendor met the timing estimate 75% of the time and give a confidence level of 75% for the specific service from the vendor.

The confidence level can be applied on a service-by-service basis, a parameter-by-parameter basis, etc., and can be associated with mandatory parameters, preferred parameters, or both. As an additional example, the confidence level may be based upon a cumulative index (e.g., which may factor criteria such as reliability, predictability, and accuracy indices). The cumulative index may be represented, for instance, in a single measure. As another example, the confidence level may actually be multiple confidence indices where each of the confidence indices is directed to a specific measure (e.g., separate indices for reliability, predictability, and accuracy, etc.). Moreover, as noted above, confidence levels (e.g., directed to vendors offering of the service) are attached to the vendors offering of the service. As noted above, the confidence level may be. Such confidence levels can be attached at the offering of the given service by the vendor, or the confidence level can be attached to the given response tag. Thus, the vendors may have an option to generate their own confidence level, or the service broker can determine the confidence level.

At 162, the service broker 104 sends the remaining estimate responses, with parameter tags and confidence levels attached, to the requester 102. In other words, the responses from the remaining vendors 106 are presented to the requester.

Based on the remaining vendors 106 listed with the parameters and confidence levels, the requester 102 selects a vendor 106. In some embodiments, the requester 102 then contacts the vendor 106 directly for the service. However, in other embodiments, the requester 102 sends the selection to the service broker 104 at 164, and the service broker 104 may set up a service level agreement between the requester 102 and the vendor (i.e., an execution request) at 166 and charge the requester 102. In some of these embodiments where the broker sets up the service level agreement, the terms of the service level agreement may be affected by the confidence level. For example, if the confidence level is low for a particular vendor's service, then there may be a stiffer penalty (e.g., financial, lower future confidence level, etc.) upon the service vendor's breach of the agreement. Also, payment for the service may go through the broker or directly from the requester to the vendor.

A pseudo-code example showing an execution request is shown below. As with the request for estimate, custom tags may be used to pass parameters.

```
{
    REQUESTID = "bar",
    RFPID = "Yong",
    RESPONSEID = "foo",
    REQUESTPAYLOAD = "$$..."
}
```

When the service has completed, the selected vendor 106 sends results of the service being performed to the service broker 104. However, the results sent to the service broker are not necessarily the results of the service running (e.g., the results are not necessarily a verification of a credit card). Instead, the results sent to the service broker include information on the estimates to the parameters provided earlier and may further include information about other possible parameters not requested by the requestor. For example, if the requester included a mandatory parameter of a five-microsecond response time and a preferred parameter that the service be performed in North America, then the parameter results should include at least an indication of the time the vendor's service took to complete and where the service was performed. At 168, the service broker 104 receives the parameter results from the vendor 106.

A pseudo-code example of the parameter results is shown below. As with the request for estimate, custom tags may be used to pass parameters.

```
{
    REQUESTID = "bar",
    PROVIDER = "Vendor A",
```

```
        RESULT "time to execute" = .023 ms,
        RESULT "geo restriction" = "North America"
    }
```

Thus, the parameter results indicate that Vendor A was the selected vendor to fulfill the service. Further, the service was executed in twenty-three microseconds and in North America. In this regard, the system may implement semantic rules on how to certain enforce tags (e.g., tags with geographical restrictions).

At 170, the service broker optionally confirms with the requester 102 that the parameter results received are indeed true, and at 172, the service broker 104 receives feedback from the requester on whether the parameter results are true. The service broker 104 then updates the objective service history 110 to reflect the parameter results for future calculations of confidence levels.

Thus, the system 100 of FIG. 1 uses mandatory parameters and preferred parameters passed through custom tags between the components to filter and order vendors 106 who may respond to a service request. Further, the parameters may be augmented by a confidence level based on objective performance values (as opposed to subjective performance values (e.g., user comments)).

Moreover, passing parameters via custom tags allows a requester to mandate parameters that are important to the requester. For example, a shoe store located in the United States may pride itself that all the shoes sold in the store were made in the U.S.A. As such, the shoe store may mandate that any software services performed on its behalf are performed in the United States (i.e., implement a geo restriction). On the other hand, a manufacturer of solar cells may value a type of power consumption or an amount of power consumption to perform services on its behalf more than anything else. As such, the manufacturer may mandate renewable energy be used and prefer that the software service be performed in a colder climate (to reduce the amount of power used to cool the servers performing the service) such as Norway or the taiga of Canada.

In all of the examples of pseudo code above, any language may be used for the actual implementation. For example, a typical implementation may include, but is not limited to, XML (Extensible Markup Language), JSON (JavaScript Object Notation), YAML (Yet Another Markup Language), etc. or combinations thereof.

Figure 2:
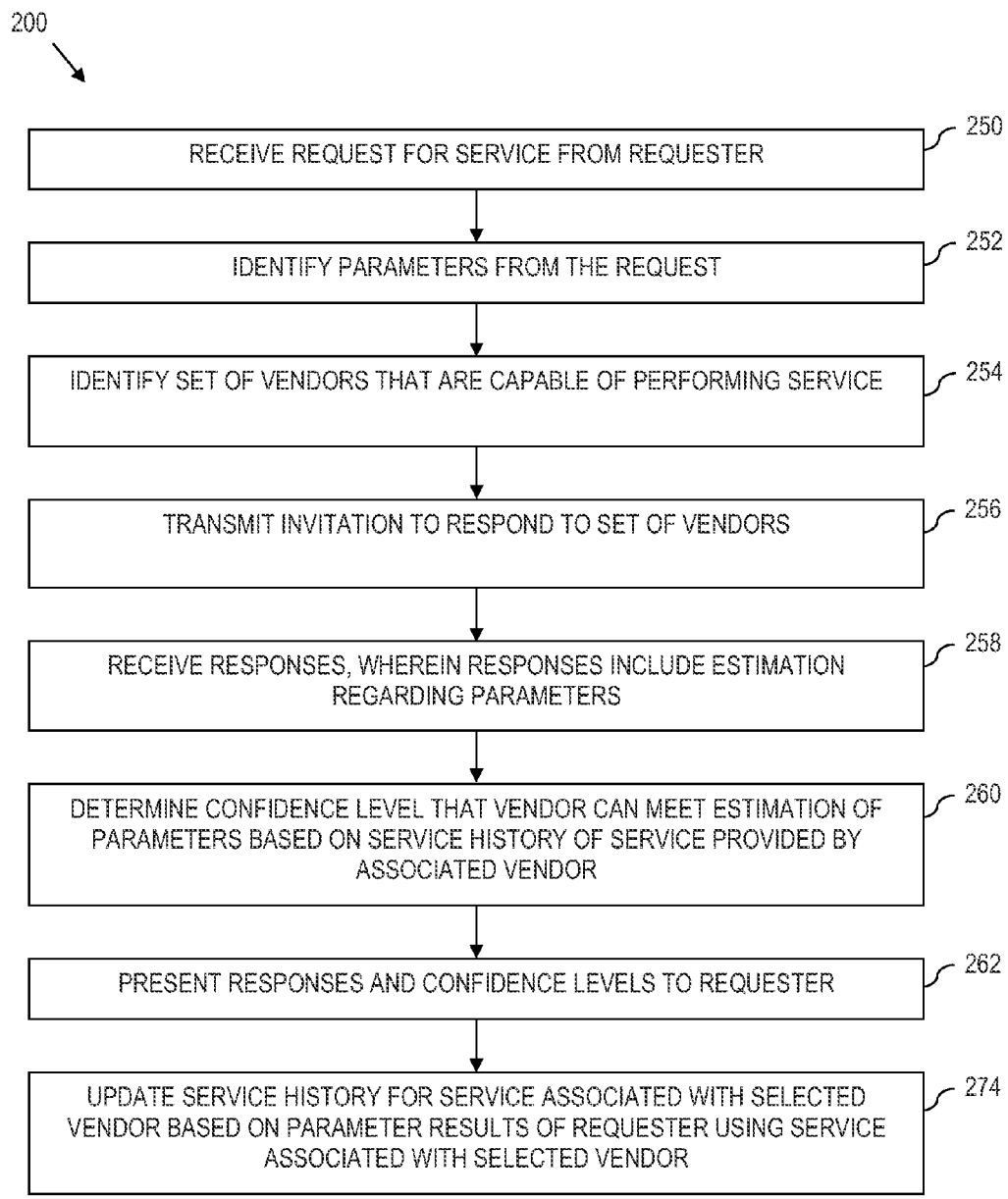
FIG. 2 is a flow chart illustrating a method for brokering a service transaction between a requester and a vendor of a service, where the method is from the aspect of a service broker, according to various aspects of the present disclosure.

Referring now to FIG. 2, a method 200 for brokering a service transaction is shown from the aspect of the service broker (104, FIG. 1). At 250, the service broker receives a request for a service. At 252, the service broker identifies parameters included in the request. For example, the requester may embed mandatory parameters and preferred parameters as metadata using custom tags in the request. The service broker identifies the parameters, the parameter types (e.g., mandatory or preferred), the parameter name (e.g., "geo location"), and parameter value associated with the parameter (e.g., "North America").

At 254, the service broker identifies a set of vendors who may satisfy the mandatory parameters of the requested service. For example, the service broker may access the service catalog to identify which vendors supply the requested service. The set of vendors may be anywhere from one vendor to all of the vendors listed in the service catalog. In a case where there are no vendors who may supply the service, the service broker informs the requester that the service may not be performed by any vendor associated with the service broker, and the method ends.

At 256, the service broker transmits an invitation to respond based on the mandatory parameters to the identified set of vendors, and at 258, the service broker receives responses from the identified set of vendors. However, the service broker only receives the responses from the vendors who send responses. For example, if the service broker identifies seven vendors for a particular service in a request, the service broker will send the invitation to respond to those seven vendors. However, assume that only six of the vendors respond for some reason. As such, the service broker will receive only six responses. As mentioned above, the responses include an estimation regarding the parameters. For example, if the mandatory parameters include time of execution and geographic location, then the response from each vendor should include estimates for those two parameters.

At 260, for each response received, the service broker determines a confidence level that the vendor will meet the estimations of the mandatory parameters. This confidence level is based on the objective past history of the service provided by the vendor. In other words, the service broker maintains a service history based on the services provided by the vendor and uses that objective service history to determine a confidence level that the service of the vendor will meet the estimations made by the vendor for the present request. The confidence levels can be on a parameter-by-parameter basis for a specific vendor or may be generalized on a service-by-server basis for a specific vendor.

At 262, the service broker presents the responses from the vendors to the requester. Further, the service broker may present the confidence levels to the requester. The requester may then select a vendor to carry out the service and contact that vendor directly to perform the service. On the other hand, the requester may send the selection to the service broker, and the service broker may set up a service-level agreement between the requester and the vendor. Either way, the vendor performs the service for the requester.

At 274, the service broker updates the objective service history for the service associated with the vendor selected by the requester, and the service broker bases the update on parameter results of the service rendered for the requester, as described above. The service broker may receive the results in any way. For example, the results may be sent by the vendor to the service broker, the service broker may monitor the service performance, the requester may send the parameter results to the service broker, or combinations thereof (e.g., the service broker may receive the parameter results from the vendor and confirm the results with the requester as described above).

Figure 3:
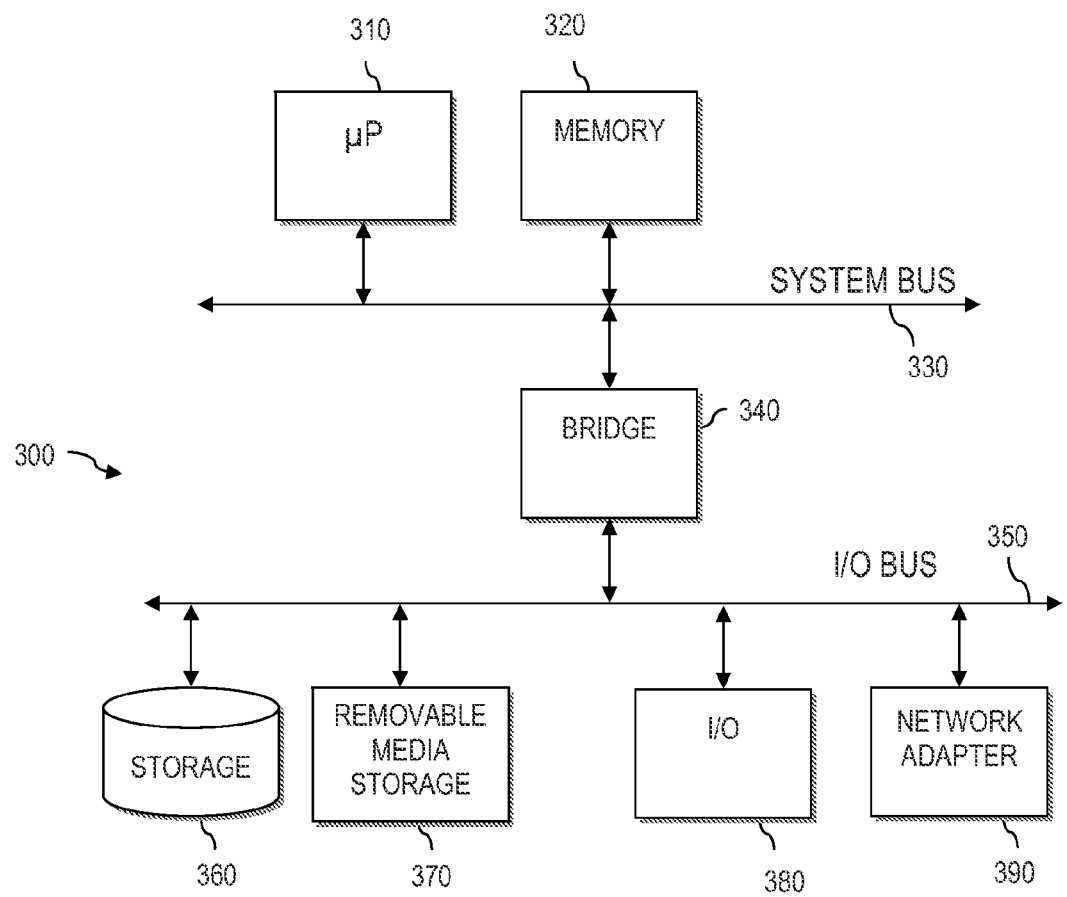
FIG. 3 is a block diagram of a computer system having a computer-readable memory for implementing functions, according to various aspects of the present disclosure.

Referring to FIG. 3, a schematic block diagram illustrates an exemplary computer system 300 for implementing the various methods described herein (e.g., by interacting with a user). The exemplary computer system 300 includes one or more microprocessors (μP) 310 and corresponding memory 320 (e.g., random access memory and/or read only memory) that are connected to a system bus 330. Information can be passed between the system bus 330 and another bus 340 by a suitable bridge 350. The bus 340 is used to interface peripherals with the one or more microprocessors (μP) 310, such as storage 360 (e.g., hard disk drives); removable media storage devices 370 (e.g., flash drives, DVD-ROM drives, CD-ROM drives, floppy drives, etc.); I/O devices 380 (e.g., mouse, keyboard, monitor, printer, scanner, etc.); and a network adapter 390. The above list of peripherals is presented by way of illustration and is not intended to be limiting. Other peripheral devices may be suitably integrated into the computer system 300.

The microprocessor(s) 310 control operation of the exemplary computer system 300. Moreover, one or more of the microprocessor(s) 310 execute computer readable code that instructs the microprocessor(s) 310 to implement the methods herein. The computer readable code may be stored for instance, in the memory 320, storage 360, removable media storage device 370 or other suitable tangible storage medium accessible by the microprocessor(s) 310. The memory 320 can also function as a working memory to store information (e.g., data, an operating system, etc.).

Thus, the exemplary computer system 300 or components thereof can implement the methods described herein. The exemplary computer system 300 can also provide computer-readable storage device(s) that store code that can be executed to implement the methods as set out in greater detail herein. Other computer configurations may also implement the methods and computer-readable storage devices as set out in greater detail herein.

Computer program code for carrying out operations for various aspects of the present disclosure set out herein, may be written in any combination of one or more programming languages. The program code may execute entirely on the computer system 300. Alternatively, the program code may execute partly on the computer system 300 and partly on a remote computer. Here, the remote computer may be connected to the computer system 300 through any type of network connection (e.g., using the network adapter 390 of the computer system 300). Still further, the program code may be implemented on a remote computer.

Figure 4:
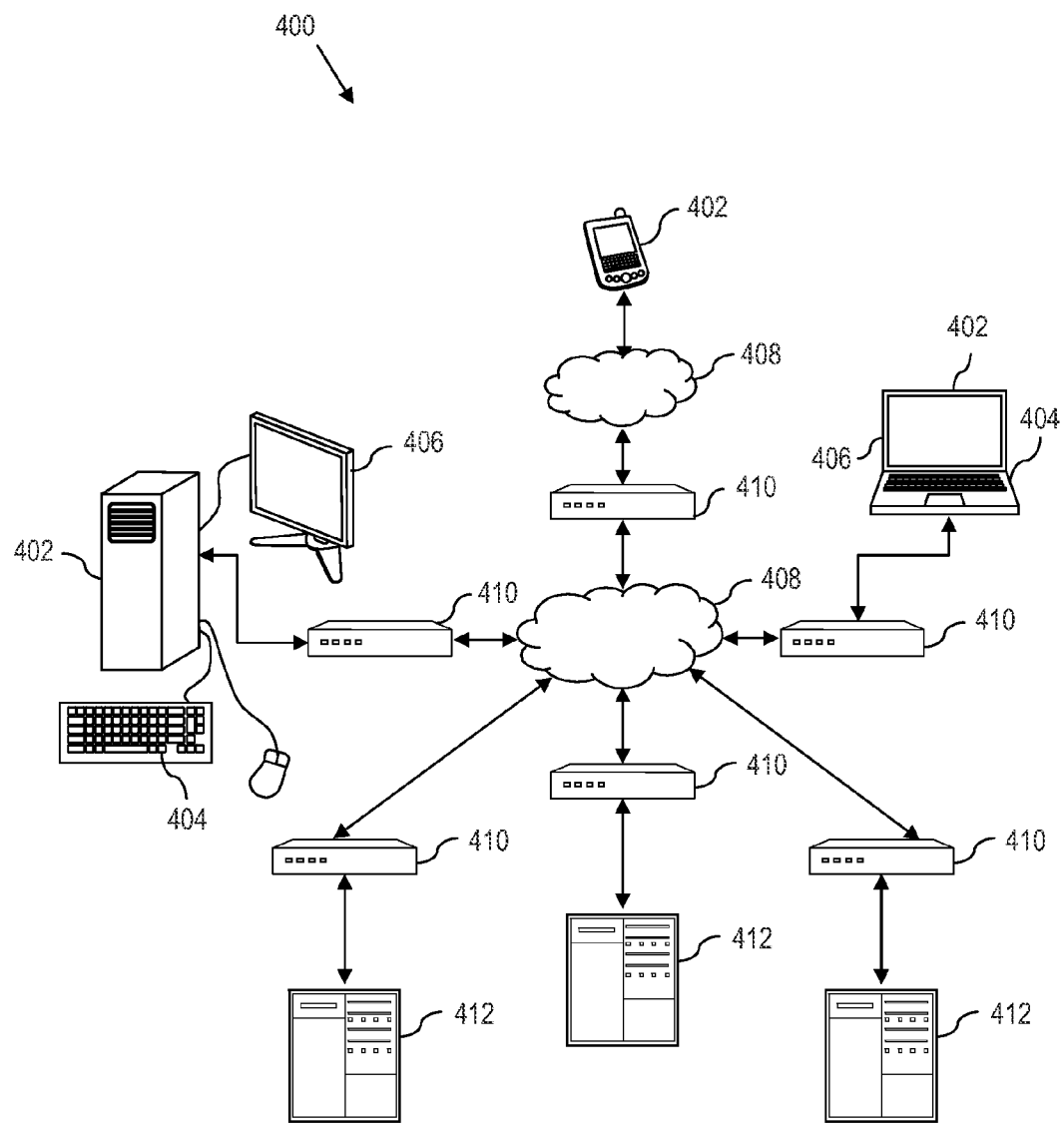
FIG. 4 is a block diagram of a cloud computing environment, according to various aspects of the present disclosure.

Referring now to FIG. 4, a general diagram of a cloud-computing system 400 is illustrated according to various aspects of the present disclosure. The computer system 400 comprises a plurality of processing devices, designated generally by the reference 402. Typical processing devices 402 include for example, personal computers, notebook computers, netbook computers, personal data assistant (PDA) processors, palm computers, cellular devices including cellular mobile telephones, and smart telephones. The processing devices 402 may also comprise servers, transactional systems, purpose-driven appliances, special purpose computing devices and/or other devices. Each processing device 402 may include an input device 404, such as a keyboard, keypad or other input, and an output device 406, such as a display device. For example, the computer system of FIG. 3 may be a processing device 402.

According to further aspects of the present disclosure, one or more processing devices 402 may optionally communicate over a network 408 (e.g., "the cloud"). The network 408 provides communications links between the various processing devices 402, and may be supported by networking components 410 that interconnect the processing devices 402, including for example, routers, hubs, firewalls, network interfaces, wired or wireless communications links and corresponding interconnections, cellular stations and corresponding cellular conversion technologies, e.g., to convert between cellular and TCP/IP, etc. Moreover, the network 408 may comprise connections using one or more intranets, extranets, local area networks (LAN), wide area networks (WAN), wireless networks (WIFI), the Internet, including the world wide web, and/or other arrangements for enabling communication between the processing devices 402, in either real time or otherwise, e.g., via time shifting, batch processing, etc.

The illustrative system 400 also includes one or more processing devices 412, e.g., servers such as web servers, file servers, and/or other processing devices. Each processing device 412 support a processing engine for executing one or more of the requester, service broker, or vendors.

The system 400 is shown by way of illustration, and not by way of limitation, as a computing environment in which various aspects of the present disclosure may be practiced. Other configurations may alternatively be implemented.

The flowchart and block diagrams in the Figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device and specifically does not include a computer-readable signal medium.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, CII, VB.NET, Python or the like, conventional procedural programming languages, such as the "c" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, material s, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method comprising:
   receiving, from a requester, a request for a service, wherein the service is a cloud service ;
   identifying parameters from the request, wherein the parameters relate to performance of the service;
   identifying custom tags in the request
   identifying mandatory parameters from the custom tags, the mandatory parameters defining parameters that the requester requires to be satisfied in performance of the service;
   identifying a set of vendors that are capable of performing the requested service;
   transmitting an invitation to respond to the set of vendors, wherein the invitation identifies the parameters;
   receiving responses to the transmitted invitation, wherein each received response includes an estimation from a vendor associated with the response, regarding the parameters;
   determining, using a processor, for each received response, a confidence level, wherein the confidence level characterizes a confidence that the vendor associated with the response will meet the estimations of the parameters and is based on an objective service history of the service provided by the vendor, wherein the objective service history based on whether the vendor objectively met the parameters with respect to previous requests for services;
   presenting the received responses and the confidence levels to the requester;
   monitoring performance of the requested service with respect to the parameters to determine parameter results; and
   updating, using the processor, the objective service history of the service associated with a vendor selected by the requester, wherein the objective service history is updated based on parameter results of the requester using the service associated with the selected vendor.

2. The method of claim 1, further comprising:
extracting parameter names of the mandatory parameters from the custom tags; and
extracting parameter values for the extracted parameter names of the mandatory parameters; and
transmitting the invitation to respond so as to include the parameter names but not the parameter values for the mandatory parameters.

3. The method of claim 2, further comprising:
identifying preferred parameters from the custom tags, the preferred parameters defining parameters that are preferably satisfied, but not required, in performing the service;
extracting parameter names of the preferred parameters from the custom tags;
extracting parameter values for the extracted parameter names of the preferred parameters; and
transmitting the invitation to respond so as to include the parameter names but not the parameter values for the mandatory parameters and the preferred parameters.

4. The method of claim 3, further comprising:
receiving responses to the invitation that include an estimation from the vendor associated with the response regarding the mandatory parameters, and an estimation from the vendor associated with the response regarding the preferred parameters;
determining a confidence level that the vendor associated with the response can meet the estimations of both the mandatory parameters and the preferred parameters; and
presenting the responses from the vendors to the requester in an order based on the vendors' estimations of the mandatory parameters and the preferred parameters.

5. The method of claim 3 further including creating a service level agreement between the requester and the selected vendor, wherein the service level agreement is based on the mandatory parameters and the preferred parameters.

6. The method of claim 1, wherein identifying mandatory parameters from the request further includes:
identifying at least a select one of: a location of a server to execute the requested service, a maximum carbon footprint of the server while the server is executing the requested service, and a method of execution.

7. The method of claim 1 further including receiving feedback about the parameter results of the requester using the service of the selected vendor, wherein the feedback is received from the vendor.

8. The method of claim 7 further including verifying the feedback received from the vendor, wherein the feedback is verified by the requester.

9. The method of claim 1 further including filtering the received responses based on the mandatory parameters and the estimations to create a filtered subset of received responses;
wherein presenting the received responses and the confidence levels to the requester includes presenting the filtered subset received responses and the confidence levels to the requester.

10. The method of claim 1, wherein the service history includes a summary of a plurality of parameter results associated with a plurality of requesters using the service from a vendor associated with the service.

11. A computer-readable memory including machine-executable program code for brokering a service transaction, wherein, when executed by a processor, the program code causes the processor to perform operations comprising:
receiving, from a requester, a request for a service, wherein the service is a cloud service;
identifying parameters from the request, wherein the parameters relate to performance of the service;
identifying custom tags in the request
identifying mandatory parameters from the custom tags, the mandatory parameters defining parameters that the requester requires to be satisfied in performance of the service;
identifying a set of vendors that are capable of performing the requested service;
transmitting an invitation to respond to the set of vendors, wherein the invitation identifies the parameters;
receiving responses to the transmitted invitation, wherein each received response includes an estimation from a vendor associated with the response, regarding the parameters;
determining, using a processor, for each received response, a confidence level, wherein the confidence level characterizes a confidence that the vendor associated with the response will meet the estimations of the parameters and is based on an objective service history of the service provided by the vendor, wherein the objective service history based on whether the vendor objectively met the parameters with respect to previous requests for services;
presenting the received responses and the confidence levels to the requester;
monitoring performance of the requested service with respect to the parameters to determine parameter results; and
updating, using the processor, the objective service history of the service associated with a vendor selected by the requester, wherein the objective service history is updated based on parameter results of the requester using the service associated with the selected vendor.

12. The computer-readable memory of claim 11, further comprising:
extracting parameter names of the mandatory parameters from the custom tags; and
extracting parameter values for the extracted parameter names of the mandatory parameters; and
transmitting the invitation to respond so as to include the parameter names but not the parameter values for the mandatory parameters.

13. The computer-readable memory of claim 12, further comprising:
identifying preferred parameters from the custom tags, the preferred parameters defining parameters that are preferably satisfied, but not required, in performing the service;
extracting parameter names of the preferred parameters from the custom tags;
extracting parameter values for the extracted parameter names of the preferred parameters; and
transmitting the invitation to respond so as to include the parameter names but not the parameter values for the mandatory parameters and the preferred parameters.

14. The computer-readable memory of claim 13, further comprising:
receiving responses to the invitation that include an estimation from the vendor associated with the response regarding the mandatory parameters, and an estimation from the vendor associated with the response regarding the preferred parameters;

determining a confidence level that the vendor associated with the response can meet the estimations of both the mandatory parameters and the preferred parameters; and presenting the responses from the vendors to the requester in an order based on the vendors' estimations of the mandatory parameters and the preferred parameters.

15. The computer-readable memory of claim 13, further comprising creating a service level agreement between the requester and the selected vendor, wherein the service level agreement is based on the mandatory parameters and the preferred parameters.

16. The computer-readable memory of claim 11, wherein identifying mandatory parameters from the request comprises identifying at least a select one of: location, carbon footprint, and method of execution.

17. The computer-readable memory of claim 11, further comprising receiving feedback about the parameter results of the requester using the service of the selected vendor, wherein the feedback is received from the vendor.

18. The computer-readable memory of claim 17, further comprising verifying the feedback received from the vendor, wherein the feedback is verified by the requester.

19. The computer-readable memory of claim 11, further comprising:

filtering the received responses based on the mandatory parameters and the estimations to create a filtered subset of received responses;

wherein presenting the received responses and the confidence levels to the requester includes presenting the filtered subset received responses and the confidence levels to the requester.

20. The computer-readable memory of claim 11, wherein the service history includes a summary of a plurality of parameter results associated with a plurality of requesters using the service from a vendor associated with the service.

* * * * *